United States Patent [19]

Scheffler et al.

[11] Patent Number: 5,102,969
[45] Date of Patent: Apr. 7, 1992

[54] PROCESS FOR THE PRODUCTION OF A SEALING AND ADHESIVE COMPOUND STRIP AND DEVICE FOR IMPLEMENTING THIS PROCESS

[75] Inventors: Ingolf Scheffler, Wiesloch; Michael Hirthammer, Heidelberg; Anton M. Schleicher, Heidelberg; Jean-Willem Delbeck, Weinheim, all of Fed. Rep. of Germany

[73] Assignee: Teroson G.M.B.H., Heidelberg, Fed. Rep. of Germany

[21] Appl. No.: 378,735

[22] Filed: Jul. 12, 1989

[30] Foreign Application Priority Data

Jul. 21, 1988 [DE] Fed. Rep. of Germany ....... 3824771

[51] Int. Cl.$^5$ ..................... C08G 18/10; C08G 18/24; C08G 18/28
[52] U.S. Cl. ........................ 528/48; 528/51; 528/52; 528/53; 528/55; 528/58; 528/59; 528/60; 528/61; 528/64; 528/65; 523/211; 525/127; 525/128; 525/131; 525/453; 525/459; 427/221; 427/222; 427/340
[58] Field of Search ............... 523/211; 525/459, 453, 525/128, 131, 127; 427/221, 222, 340; 528/48, 51, 52, 53, 55, 58, 60, 61, 64, 59, 65

[56] References Cited

U.S. PATENT DOCUMENTS

| | | | |
|---|---|---|---|
| 3,459,683 | 8/1969 | McCoy et al. | 528/64 |
| 3,476,806 | 11/1969 | Wolf | 528/64 |
| 3,755,261 | 0/1973 | Van Gulick | 528/60 |
| 3,860,565 | 1/1975 | Barber, Jr. | 523/211 |
| 3,888,831 | 6/1975 | Kogon | 528/60 |
| 3,891,606 | 6/1975 | Kogon | 528/60 |
| 3,899,438 | 8/1975 | Kalil | 528/64 |
| 3,900,447 | 8/1975 | Van Gulick | 528/61 |
| 4,081,901 | 0/1978 | Miller | 29/885 |
| 4,125,522 | 11/1978 | Becker | 528/61 |
| 4,481,345 | 11/1984 | Nachtkamp et al. | 528/60 |
| 4,517,331 | 5/1985 | Parker et al. | 528/64 |
| 4,719,267 | 1/1988 | Rizk et al. | 525/453 |
| 4,814,411 | 3/1989 | Bethea et al. | 528/64 |
| 4,950,715 | 8/1990 | Duck et al. | 528/64 |

FOREIGN PATENT DOCUMENTS 1594300 8/1969 Fed. Rep. of Germany.
2426366 12/1974 Fed. Rep. of Germany ...... 525/453

*Primary Examiner*—John Kight, III
*Assistant Examiner*—Rabon Sergent
*Attorney, Agent, or Firm*—Vincent L. Fabiano; Valerie E. Looper

[57] ABSTRACT

In a method for the production of a sealing and adhesive strip, particularly for the direct glazing of motor vheicles, using a moisture-hardening single-component polyurethane composition based on telechelic isocyanate prepolymers of aromatic diisocyanates in stoichiometric excess and polyols a composition is employed comprising a) a catalyst for the moisture-hardening and b) a blocked activatable cross-linking agent, and a solvent or solvent mixture is continually injected into the inside of the strip during the extrusion of the strip which liberate the cross-linking agent.

For the implementation of the method an extrusion nozzle for the sealing and adhesive strip is used which comprises an injection needle for the solvent opening into the nozzle, the exit opening of which points in the extrusion direction and is located in the region of the center axis of the extrusion die forming the strip.

11 Claims, 1 Drawing Sheet

PROCESS FOR THE PRODUCTION OF A SEALING AND ADHESIVE COMPOUND STRIP AND DEVICE FOR IMPLEMENTING THIS PROCESS

Numerous formulations for single-component sealing and adhesive compounds are already known which contain prepolymers with telechelic isocyanate groups (manufactured from diisocyanates in stoichiometric excess with polyols) and which harden under the influence of moisture. When aromatic isocyanates are used, catalysts—particularly tin compounds—are added to these systems to accelerate the hardening.

These single-component PU-systems are also used inter alia in automobile construction for direct glazing of motor vehicles. Problems can, however, occur when the air moisture is low, particularly when outside temperatures are fairly cold in the period from September to March. The hardening of the sealing compound then occurs so slowly that the window panes have to be held for quite a long time with the aid of suitable holding devices. Further assembly work, e.g. attaching the doors or working with the car body tilted, cannot be carried out as long as the sealing compound has not sufficiently hardened.

It is known from U.S. Pat. No. 3,755,261 that prepolymers with isocyanate end groups can be cross-linked at elevated temperature if a stoichiometric quantity of a complex compound of methylene dianiline and sodium chloride is added to them. At higher temperatures this complex dissociates into free methylene dianiline and sodium chloride, and the methylene dianiline reacts with the isocyanate groups of the prepolymers to form a cross-linked urea. At room temperature this mixture is storage-stable. In the U.S. patent specification no reference is made to hardening under the effect of moisture. It is also known that these PU-systems can be heated by microwaves to cause them to harden (U.S. Pat. No. 4,081,901). In both processes the complex compound, composed of methylene dianiline and sodium chloride, is admixed shortly before the hardening reaction in stoichiometric quantities relative to the reactive isocyanate groups of the polyurethane prepolymers.

Two-component PU-systems are capable of rapid hardening, but handling these is considerably more complicated and requires more sophisticated apparatus.

There is consequently the need for a process using a single-component sealing and adhesive compound on a polyurethane base which can rapidly be hardened sufficiently for an adequate mechanical stability to be achieved. The complete permanent hardening process, e.g. under the influence of moisture, could then take a longer period of time without hindering or impairing the assembly work.

The invention is directed to a process for the production of a sealing and adhesive compound strip, particularly for the direct glazing of motor vehicles, using a moisture-hardening single-component polyurethane composition based on telechelic isocyanate prepolymers obtained from aromatic diisocyanates in stoichiometric excess and polyols, which is characterized in that a compound is used comprising a) a catalyst for the moisture hardening and
b) a blocked activatable cross-linking agent and that during the extrusion of the strip a solvent or solvent mixture is continuously injected into the inside of the strip which liberates the cross-linking agent.

Preferably, the blocked activatable cross-linking agent is added in clearly less than stoichiometric quantities.

If during the application of the sealing and adhesive compound used according to the invention the absolute air moisture is sufficiently high, the composition hardens like conventional single-component adhesive and sealing compounds with the air moisture at room temperature. If, however, the available air moisture is not sufficient for rapid hardening, or if fairly high mechanical strengths are required only a very short time after the application of the adhesive and sealing strip, the blocked cross-linking agent can be activated by injecting the solvent so that partial hardening in the form of a core in the inside of the strip can be achieved in a short time. The further hardening to final strength then takes place by further reaction with air moisture. With a process of this type the user gains the option of deliberately influencing the hardening characteristics of the adhesive strip without having to alter the composition of the adhesive and sealing compound. Using this process the problems described above in the direct glazing of motor vehicles on assembly lines can in particular be solved, but because of the very small amount of equipment needed, the sealing and adhesive composition according to the invention can also be used in motor vehicle work shops in the replacement of windshields.

Although the use in the automobile industry represents a preferred application, the process according to the invention can be used to advantage anywhere where initial strengths are required in a short time which cannot be achieved by conventional moisture-hardening materials alone.

The polyurethane prepolymers are manufactured in a manner known per se from excess aromatic diisocyanate and a polyol. Suitable aromatic diisocyanates are, for example, diphenylmethane diisocyanate (MDI), toluylene diisocyanate (TDI), naphthalene diisocyanate, p-phenylene diisocyanate and 1,3-bis-(isocyanatomethyl)benzene and m- or p-tetramethylxylol diisocyanate (m-TMXDI or p-TMXDI).

As polyol components polyetherpolyols such as polyethylene oxide, polypropylene oxide, polytetrahydrofuran and their copolymers and polyesterpolyols and hydroxy-functional polycaprolactone are suitable. The compatible mixtures disclosed in EP-OS 240 698 of polyetherpolyols, polyesterpolyols and hydroxyfunctional methacrylate polymers of low molecular weight can also be used.

The preferred catalysts for the moisture-hardening of the aromatic isocyanate prepolymers are tin compounds such as tin (II)-octoate, dibutyltinlaurate and dibutyltinmaleate. In addition, organo-mercury, organo-lead and organo-bismuth compounds, such as for example phenyl-mercury-acetate or leadnaphthenate can be used. Quantities of 0.01 to 1.0 and more particularly 0.02 to 0.5% by weight, are preferably used. Additionally, the aforementioned catalysts can be combined in a known manner with tertiary amines.

As blocked cross-linking agents which can be activated by the addition of solvents, one should mention complexed amines, in particular the complex compound of methylene dianiline (MDA) and NaCl. In this complex the MDA is present in an expanded salt lattice, the stoichiometric composition of this complex is indicated in the literature by (MDA)$_3$.NaCl. This compound can be obtained from the Uniroyal Company under the trade name "CAYTUR". Other complexes of MDA or of 2,3-di(4-aminophenyl)butane with sodium bromide, sodium iodide, sodium nitrite, lithium chloride, lithium bromide, lithium iodide, lithium nitrite or sodium cyanide are also suitable. Additionally suitable are the complexes of tris(2-aminoethylamine) with alkaline earth compounds such as, for example, calcium chloride, magnesium chloride or strontium chloride and solid polyamine complexes which are insoluble in the system at temperatures below 60° C. and which dissociate sufficiently rapidly under the influence of a solvent. Quantities of 0.25 to 5.0, and more preferably 0.5 to 2.0% by weight of cross-linking agent are added.

By the addition of suitable solvents these complex compounds dissociate and the liberated polyamine reacts with the isocyanate groups of the polyurethane prepolymers under formation of urea bonds. The strength required after this pre-crosslinking can be controlled within certain limits; e.g. the number of isocyanate groups reacting can be regulated by the quantity of complex compound added. The selection criteria for this are the temporary mechanical strength required and the time available for the pre-hardening. Due to the addition of the solvent and the liberation of the hardener thereby achieved the prehardening takes place in the sealing and adhesive strip from the inside to the outside. A hardened core forms, the diameter of which increases rapidly with time, as can be observed. It is clear that there is no diffusion of the hardener here, instead the reaction is initiated by the freed amine, or water. The complete permanent hardening and the achievement of the final strength is then brought about by the reaction of the remaining isocyanate groups of the prepolymers with the air moisture under the influence of the catalyst.

As further activatable cross-linking agents polyamino- or polyhydroxyfunctional compounds are to be considered which are microencapsulated and therefore are not available for a reaction with the isocyanate prepolymers during storage at room temperature. The functionality and molecular weight of the polyamino- or polyhydroxy-functional compounds in this case follow the desired mechanical properties of the hardened adhesive and sealing material. Preferably, in this case these are difunctional amines of low molecular weight or alcohols, because these owing to their low molecular weight are only added in very low percentages. For the encapsulation the cross-linking agent is dispersed in sufficiently fine particles and then a shell of a suitable monomer is polymerized on to the nucleus of the cross-linking agent. Examples of suitable polymers are polymethylmethacrylate, produced by the addition of liquid or dissolved polyisocyanates, which then react with the surface of the cross-linking agent to form a strong shell, and polycyanoacrylates, produced by the addition of cyanoacrylate monomers, which react with the cross-linking agent in an anionic polymerization on the surface. Further possibilities for the production of the inert shell around the cross-linking agent are the known coazervation techniques, by which gelatine shells are produced on the surface of the cross-linking agent. In addition to the processes listed here for the production of a sealed polymer shell around the cross-linking agent many other polymers and copolymers are suitable to produce this shell. The following selection criteria are to be observed: the monomer for the shell should have as little solubility as possible in the cross-linking agent and be completely polymerizable at relatively low temperatures. The shell polymer thus produced must have a softening point of above 60° C. and should not swell with the remaining constituents of the adhesive and sealing compound below 60° C., or be soluble in them.

The encapsulated cross-linking agent preferably has a melting or softening point between 60° and 90° C., so that it can be placed in an inert solvent during the encapsulation process as a very finely divided dispersion. Examples of such cross-linking agents are diamines such as ethylene dianiline, 2,3-di(4-aminophenyl)butane, hexamethylene diamine and dodecamethylene diamine. Examples of suitable diols are neopentylglycol, hexandiol, decandiol, hydroxypivalic acid neopentylglycolester and other polyesterdiols with a melting or softening point between 60° and 120° C. Such encapsulated cross-linking agents have an advantage over the salt complexes of diamines in that they contain no salts such as sodium chloride.

The single-component polyurethane system used according to the invention distinguishes itself in that the cross-linking agents described have only to be added in a very low percentage to the single-component, moisture-hardening adhesive and sealing materials. By this means the desirable properties of these will not be affected, e.g. excellent adhesion is achieved to painted metal and pre-treated glass which is absolutely necessary for the direct glazing of automobiles. The system thus has an extremely good stability and can therefore be extruded in the desired profile form onto the glass pane or the flange parts.

To activate the blocked or micro-encapsulated cross-linking agent, polar aprotic solvents can be used according to the invention. Suitable, for example, are acetaldehyde and its derivatives, benzonitrile, n-butylacetate, $\tau$-butyrolactone, chlorobenzene, alkylsubstituted chlorobenzenes, chloroform, 2-caprolactone, cyclopentane carboxaldehyde, dichlormethane, diethoxysulphide, diethyleneglycoldiester, 2,2'-(dimethylamino)diethylester, dimethylformamide, dimethylsulphoxide, 2,6-dimethyl-4-pyrone, dioxan, ethylacetate, formaldehyde, dimethylacetal, hexamethylphosphoric acid triamide, isobutylmethylketone, methylethylketone, N-methylpyrrolidone, methoxybenzene, 2-methyl-4-pentanone, 2-methylpyrazine, nitroaliphates, nitrobenzene, 2,4-pentadione, phosphoric acid tributylester, pyridine, tetrahydrofuran, tetrahydronaphthaline, trichloroethylene, valeraldehyde, N-vinylimidazol and N-vinylpyrrolidone. Particularly preferred are $\tau$-butyrolactone, tetrahydrofuran, N-vinylpyrrolidone and N-methylpyrrolidone. Mixtures of several solvents can also be used. Moreover, water can be added to the aprotic solvents, provided that it does not hinder the activation of the blocked or microencapsulated cross-linking agent, which can easily be tested in each individual case. Preferably, the water content does not, however, amount to more than around 30% by weight in relation to the solvent as a whole. The water can on the one hand react with isocyanate groups, on the other hand it may activate the cross-linking agent, by e.g. dissolving the salt from the MDA-complex or by dissolving the shell polymer in the case of encapsulated compounds.

Under some circumstances it may be advantageous to add to the solvent or solvent mixture an additive which prevents the formation of a hollow channel inside of the sealing strip since such channel may impair the mechanical strength of the strip. Suitable additives of this type are especially the isocyanate prepolymers forming also the base of the sealing and adhesive composition, but without the catalyst and the cross-linking agent. Generally the content of such additives, especially of isocyanate prepolymer, in the injection mixture is up to 10% by weight, preferably about 2 to 8% by weight.

When applying the sealing and adhesive compound strip to a substrate, e.g. a glass pane for a motor vehicle, the solvent injection is best started with only a slight delay compared with the extrusion of the strip, and ended shortly before the completion of the extrusion to avoid premature hardening of the two ends of the strip and to make it possible to join them without a weld. In addition, this prevents the solvent or solvent mixture from running out of the strip, because the ends of the strip remain closed. Due to the partial permanent hardening in the remaining areas of the glass/metal bond the window can be fixed with sufficient firmness within a very short time after insertion in the vehicle body, thus avoiding slipping. The partial hardening of the adhesive and sealing compound makes any additional mechanical fixing of the glass pane unnecessary. The complete permanent hardening of the adhesive and sealing material occurs by reaction with the air moisture present at room temperature.

BRIEF DESCRIPTION OF THE DRAWINGS

A device suitable for carrying out the process according to the invention in the form of an extrusion nozzle is shown schematically in cross-section in FIGS. 1a and 1b. The adhesive and sealing compound is supplied to the extrusion nozzle from above at 2. It exits laterally below from the triangular die opening 3 and is applied to the appropriate substrate (e. g. the glass pane) in the form of a strip which is triangular in cross-section. An injection needle 4 for the solvent or solvent mixture is attached to the extrusion nozzle from the side, and the solvent enters the needle at 5. The exit opening 6 of the injection needle points in the extrusion direction and is located in the region of the centre axis of the die opening 3 which forms the strip, so that the solvent can be injected in longitudinal direction into the interior, and preferably into the centre of the profiled strip. The solvent or solvent mixture can be added in doses with the aid of a plunger burette or a similar dosing device. A specific stoichiometric ratio need not be maintained here.

Figure 1A:
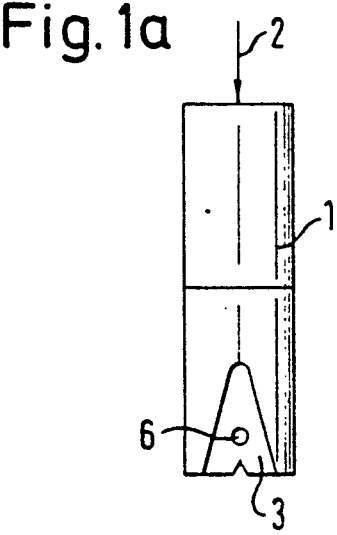
Figure 1B:
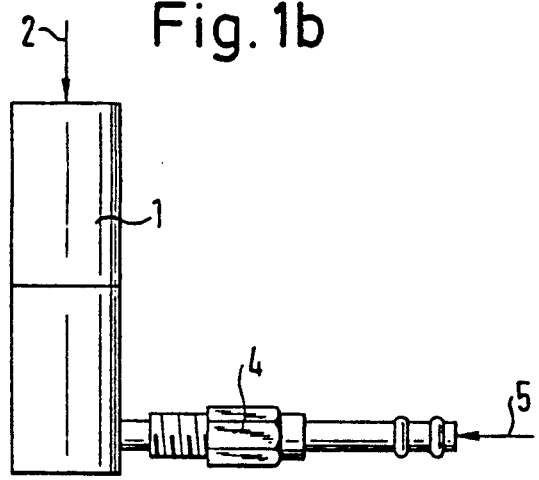
Figure 2A:
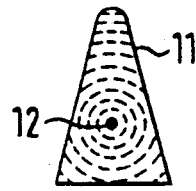
FIG. 2 shows in cross-section a profiled strip manufactured according to the invention. The profiled strip 11 contains the injected solvent approximately in the centre (FIG. 2a). After a short time a hardened core of a considerably greater diameter has already formed concentrically from the solvent (FIG. 2b) and soon afterwards the permanently hardened area reaches the outer boundary surfaces of the profile (FIG. 2c).
Figure 2B:
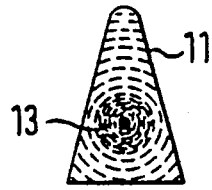
Figure 2C:
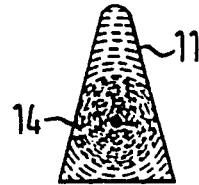
Figure 3:
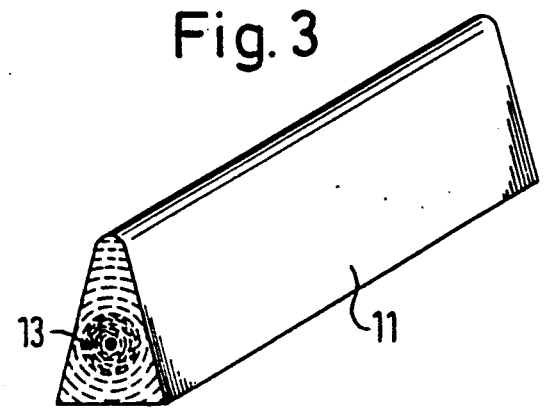
In FIG. 3 the state in FIG. 2b is shown once again in section in perspective.

The following examples are intended to provide a more detailed explanation of the invention without, however, limiting it.

EXAMPLE 1

An adhesive and sealing material is manufactured in a vacuum planetary mixer from the following components:

52.44% PU-prepolymers of a polyetherol and MDI with reactive isocyanate end groups (isocyanate equivalent weight 3400)
31.35% of a mixture of carbon black and finely divided calcium carbonate in the weight ratio of 2:1
14.97% $C_7$–$C_{11}$-alcohol phthalate as a plasticiser
0.20% nickel dibutyl dithiocarbamate
0.04% dibutyl tin maleate as a catalyst
1.00% complex compound $(MDA)_3NaCl$ as a blocked cross-linking agent.

For comparison an adhesive and sealing material was manufactured as shown above but the complex compound was replaced with the same proportions of filler and plasticiser.

For the subsequent hardening experiments adhesive bonds were made from glass panes (dimensions 100×25×5 mm); the surfaces to be adhered to were pretreated with isopropanol and a suitable primer. The dimensions of the adhering joint were 25×8×5 mm. The respective tensile strength was measured in $N/cm^2$ for each of the hardening conditions given in the subsequent tables.

With the materials used according to prior art the rate of hardening is very much dependent on the moisture available. Table 1 shows the tensile strengths measured on pretreated glass-glass bonds at 25% and 50% air moisture using the mixture without the complex compound.

TABLE 1

| Time | 25% r.h. $N/cm^2$ | 50% r.h. $N/cm^2$ |
|---|---|---|
| 1 day | 68 ± 4 | 110 ± 25 |
| 3 days | 175 ± 44 | 338 ± 40 |
| 7 days | 255 ± 60 | 442 ± 21 |

(Break generally cohesive)

The above sealing and adhesive composition was hardened by the injection of a solvent mixture at 25% and 50% air moisture and a temperature of 23° C. Table 2 shows the tensile strengths ($N/cm^2$) measured on the glass-glass bond using various solvent mixtures:

A 70% by weight r-butyrolactone + 30% by weight water
B 70% by weight tetrahydrofuran + 30% by weight water
C 70% by weight N-vinylpyrrolidone + 30% by weight water

TABLE 2

| | A | | B | | C | |
|---|---|---|---|---|---|---|
| Time | 25% r.h. | 50% r.h. | 25% r.h. | 50% r.h. | 25% r.h. | 50% r.h. |
| 1 day | 142 ± 42 | 195 ± 70 | 103 ± 19 | 88 ± 27 | 80 ± 30 | 120 ± 53 |
| 3 days | 346 ± 41 | 318 ± 87 | 211 ± 2 | 236 ± 92 | 180 ± 104 | 194 ± 104 |
| 7 days | 354 ± 22 | 357 ± 29 | 268 ± 47 | 358 ± 64 | 321 ± 64 | 320 ± 11 |

EXAMPLE 2

To determine the rate of through-hardening with moisture excluded, various solvents were injected in triangular extrusions into the material of Example 1. Directly after the application of the extrusions the material was packed in aluminium foil to exclude moisture.

The rate of throughhardening was determined using the diameter of core formation; at 10 mm diameter complete through-hardening is achieved. Without the injection of solvent no hardening occurred at all under these conditions.

TABLE 3

| Time (h) | NVP:H$_2$O 70:30 Core (mm) | BL 100 Core (mm) | BL/H$_2$O 70/30 Core (mm) |
|---|---|---|---|
| 0.5 | 3.0 | 2.5 | 3.1 |
| 1 | 3.6 | 3.7 | 3.8 |
| 2 | 5.0 | 5.1 | 5.2 |
| 4 | 7.0 | 6.3 | 7.0 |
| 6 | 10.0 | 9.6 | 10.0 |

NVP = N-vinylpyrrolidone
BL = τ-butyrolactone

EXAMPLE 3

Dodecamethylene diamine was ground in a mortar mill to a grain fineness < 100 μm. In an apparatus consisting of a three neck flask, a rotary pump and a photo reactor equipped with a 250 W mercury vapor lamp, 60 g of the amine was processed in the three neck flask to an aqueous dispersion containing 20% solid material. In a nitrogen atmosphere 100 g of methylmethacrylate, in which was dissolved 0.1% of a photoinitiator of the benzoin ether type, was dripped into this dispersion with constant the photoreactor into the three neck flask and continually pumped from the photoreactor into the three neck flask and back. After three hours the addition of monomer ended, for complete polymerisation the dispersion was pumped for an additional 2 hours through the photoreactor. The thus encapsulated amine was then filtered off and dried in a high vacuum.

A 3% dispersion of this amine in a prepolymer plasticizer mixture, as used for the manufacture of the adhesive/sealing material in Example 1, exhibits a fully satisfactory storage stability. If this mixture is mixed with a solvent as in example 1, it is permanently hardened after a short time, i.e. the encapsulated amine is suitable for the process according to the invention. Particularly preferred solvents are in addition to those already mentioned above (τ-butyrolactone etc.) butylacetate, chloroform and diethylene glycoldiester.

EXAMPLE 4

Methylene dianiline was ground in a mortar mill to a grain fineness < 100 μm. 40 g of the amine was dispersed in dry petrol ether to form a 20% dispersion in a three neck flask with moisture excluded. Under rapid agitation 28 g of a liquid diphenylmethane diisocyanate (MDI, isocyanate equivalent weight 143) was dripped into this dispersion over four hours. After a further 3 hours agitation no isocyanate could be detected in the dispersion using the infrared spectrum. The finely divided solid was filtered off and dried under vacuum.

A 3% dispersion of this amine encapsulated with polyurea in a prepolymer/plasticizer mixture also shows a fully satisfactory storage stability and rapid permanent hardening when solvent is added, i.e. the encapsulated amine is suitable for the process according to the invention. The solvents already mentioned above (τ-butyrolactone etc.) are particularly preferred.

We claim:

1. A method of producing a sealing and adhesive compound strip, the steps comprising extruding a moisture-hardening single-component polyurethane composition composed of
   a) telechelic isocyanate prepolymers from aromatic diisocyanates in stoichiometric excess and polyols,
   b) a moisture-hardening tin catalyst and
   c) a blocked activatable crosslinking agent, and injecting a polar aprotic solvent or solvent mixture into the inside of the strip which liberates the crosslinking agent.

2. The method of claim 1, characterized in that the composition comprises as blocked cross-linking agent a methylene dianiline; sodium chloride complex compound.

3. The method of claim 1, characterized in that the solvent is tetrahydrofuran, N-vinylpyrrolidone, N-methylpyrrolidone or mixtures of these.

4. The method of claim 1, characterized in that up to 30% by weight of water is added to the solvent or solvent mixture.

5. The method of claim 1, characterized in that an isocyanate prepolymer is added to the solvent or solvent mixture.

6. The method of claim 5, characterized in that the isocyanate prepolymer is present in the injection mixture in an amount of up to 10% by weight.

7. The method according to claim 1, characterized in that in the production of the sealing and adhesive strip the solvent injection is started with a slight time delay compared with the extrusion of the strip and is ended shortly before the completion of the extrusion.

8. The method of claim 1, wherein the solvent or solvent mixture is continuously injected with the strip during extrusion.

9. A method of producing a sealing and adhesive compound strip, the steps comprising extruding a moisture-hardening single-component polyurethane composition composed of
   a) telechelic isocyanate prepolymers from aromatic diisocyanates in stoichiometric excess and polyols,
   b) a moisture-hardening, tin catalyst, and
   c) a blocked activatable cross-linking agent which is a polyamino or hydroxy functional compound in microencapsulated form, and injecting a polar aprotic solvent or solvent mixture into the inside of the strip which liberates the cross-linking agent.

10. The method of claim 9, characterized in that the polyamino or hydroxyfunctional compound is solid at room temperature but liquid at temperature above 60° C.

11. The method of claim 9 or 10, characterized in that the shell of the microcapsules is formed from a poly(meth)acrylate.

* * * * *